United States Patent [19]
Campbell

[11] Patent Number: 5,150,730
[45] Date of Patent: Sep. 29, 1992

[54] PROVISIONAL PROTECTIVE MEANS FOR PIT VALVE CASING

[75] Inventor: Teddy G. Campbell, Brookfield, Conn.

[73] Assignee: Texaco, Inc., White Plains, N.Y.

[21] Appl. No.: 844,053

[22] Filed: Mar. 2, 1992

[51] Int. Cl.⁵ .............................................. F16L 5/00
[52] U.S. Cl. .................................. 137/364; 137/377; 137/382
[58] Field of Search ................. 137/363, 364, 377, 382

[56] References Cited

U.S. PATENT DOCUMENTS

| | | | |
|---|---|---|---|
| 2,945,294 | 7/1960 | Courtot et al. | 137/382 |
| 2,964,054 | 12/1960 | Weatherhead, Jr. | 137/382 |
| 3,926,899 | 5/1990 | Argandona | 137/364 |
| 3,964,508 | 6/1976 | Miller | 137/377 |
| 4,762,440 | 8/1988 | Argandona | 137/363 |
| 4,890,638 | 1/1990 | Davenport | 137/377 |

Primary Examiner—A. Michael Chambers
Attorney, Agent, or Firm—Robert A. Kulason; James J. O'Loughlin; Robert B. Burns

[57] ABSTRACT

A protective cage for provisional engagement with a pit valve casing during a transfer of a fluid such as a liquid fuel through the pit valve and into a transfer conductor. A framework protrudes above the valve casing and includes a plurality of force deflecting members which are fixed to a base plate thereby defining a deflector which avoids the inadvertent damage to the pit valve or to the transfer conductor's coupling.

10 Claims, 2 Drawing Sheets

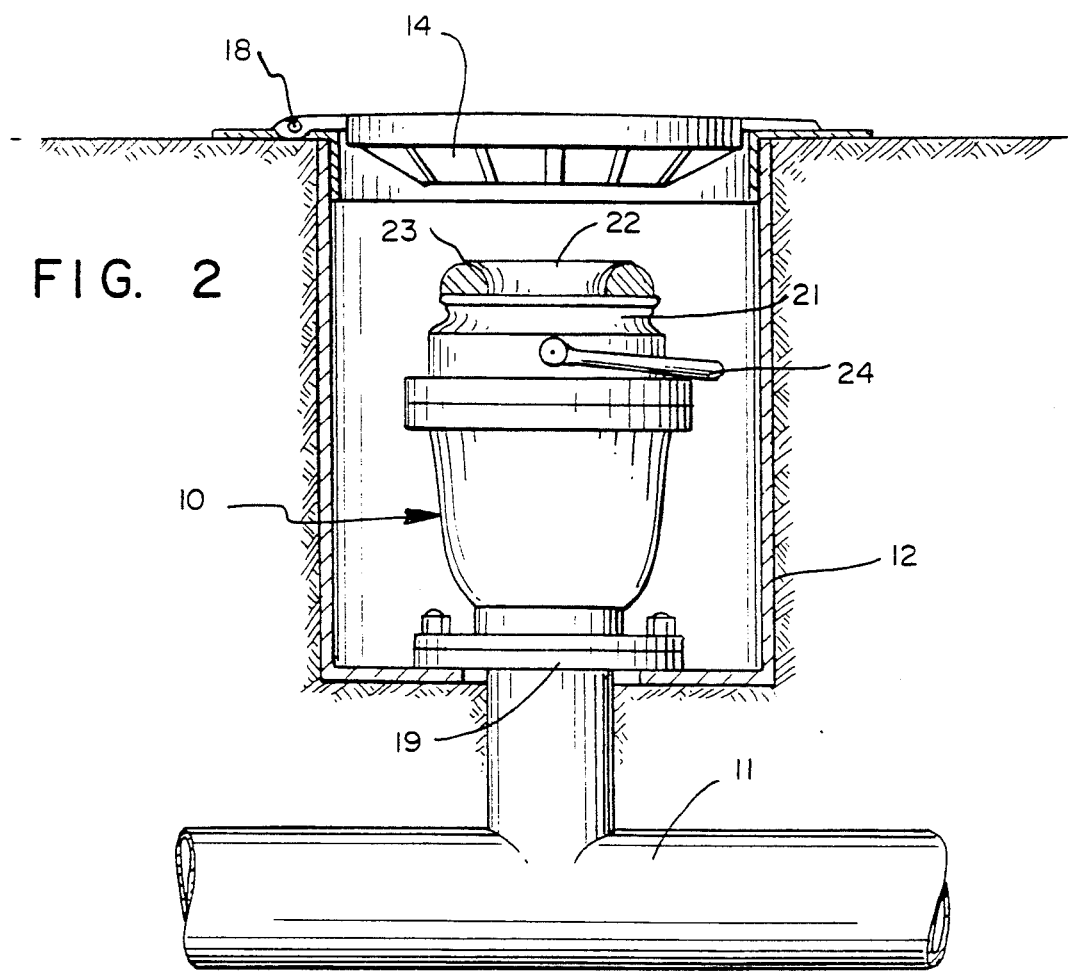
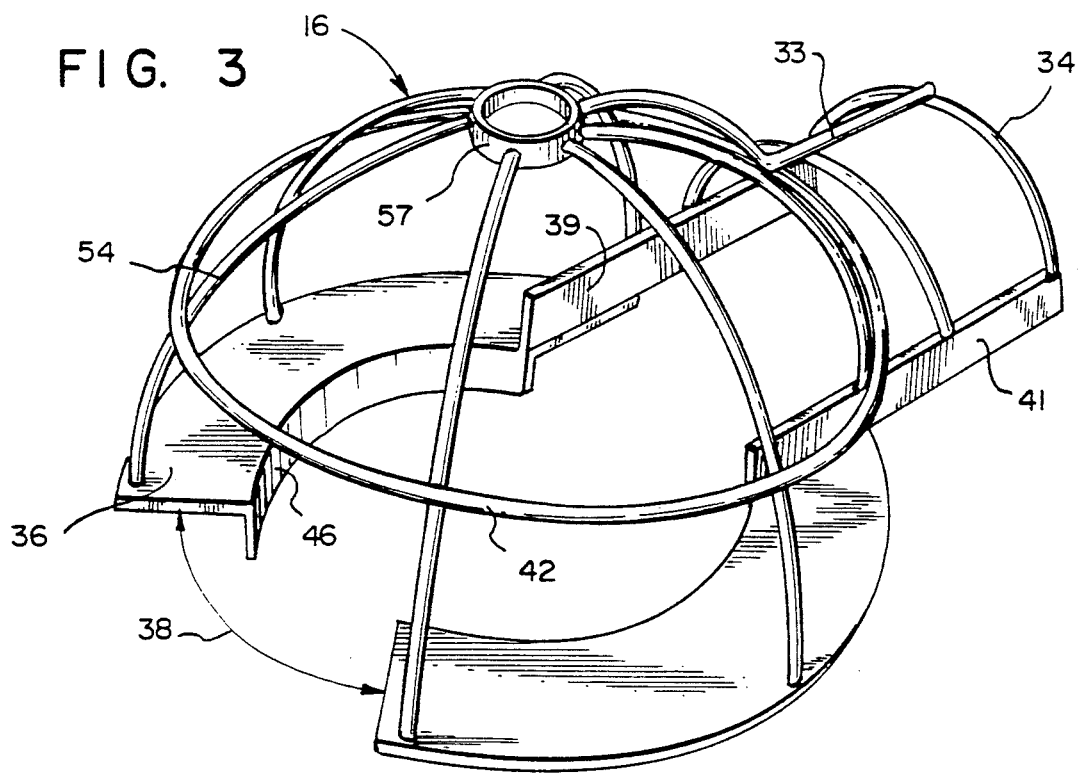

PROVISIONAL PROTECTIVE MEANS FOR PIT VALVE CASING

BACKGROUND OF THE INVENTION

At any airport, particularly in the instance of commercial aviation, incoming aircraft are normally refueled and prepared for further use, directly at a loading gate. This procedure facilitates effective usage of the aircraft and avoids moving it to a loading areas solely for the purpose of one flight preparation.

Since the principal pre-flight preparation involves refueling, the following disclosure will be addressed solely to this subject.

Although tanker trucks carrying aviation fuel are often used for the refueling operation, such trucks are normally cumbersome. They can constitute a traffic problem as well as a physical hazard and may be incapable of carrying sufficient quantities of fuel. These undesirable conditions are found to be true in any loading area where varied types of vehicles and personnel are moving about toward preparing an aircraft for flight.

To avoid the use of moving tanker trucks for this diverse operation it has been found desirable to utilize an underground fuel system. Such a system connects with a main fuel source, having valve outlets at each terminal gate, or positioned where an aircraft can be conveniently refueled.

As a matter of practicality, in this form of fuel transfer system, the valve at each terminal is usually embedded into the ground and furnished with a cover to avoid being a hazard to equipment and personnel. Thus, the flow control valve, often referred to as a pit valve, is placed within a casing or similar enclosure means which is embedded into the substrate beneath ground level.

To be manually accessible for a refueling operation, the control valve is close enough to ground level that it can be readily provisionally connected to a fuel transfer conductor. When the latter is utilized, the conductor hose is brought to the aircraft by a refueling crew. The conductor will normally be comprised of a coupling at one end which detachably engages the discharge port of the pit valve. The other end of the conductor will comprise a nozzle adapted to engage, the aircraft fuel tank.

Operationally, when the necessary connection is made between a pit valve and the aircraft, opening of the valve will initiate a flow of fuel from the underground source, through the pit valve and into the aircraft tank.

An ever present defect in this type of system results from the fuel transfer conductor and its connection to the underground control valve, being inconspicuous during the refueling operation. Experience has shown that in view of the number of vehicles which move about the aircraft, the fuel conductor connection is in constant jeopardy. The degree of the peril increases substantially at night when the fuel conducting hose may not be as visible as it should be.

It can be appreciated that a vehicle such as a luggage carrier, a food loading truck or the like, could inadvertently come into rolling contact with the fuel carrying hose or the coupling which is engaged to the pit valve.

In such an instance, the hose, as well as the pit valve connection will be placed in danger of being damaged or broken. The result could be severed hose or distorted control valve and coupling connection, with fuel being discharged under pressure about the immediate area.

Toward precluding or minimizing the possibilities of fuel being inadvertently discharged during the aircraft refueling operation, there is here disclosed a protective apparatus that can be applied at ground level. Functionally, it forms a protective barrier to the subsurface control valve and, the detachable coupling, as well as to a portion of the fuel carrying hose itself.

The protective unit is provisionally placed across the pit valve casing to form a rigid, rotatable partial closure to the casing open upper end. The protective member further includes an appendage which registers about a short section of the fuel carrying hose immediately adjacent to the control valve.

The fuel conductor includes a coupling having a lifting handle or bail which facilitates the conductor being manipulated into place for sealably engaging a valve discharge port. With the protective unit in place, the coupling, as well as the valve and the conductor hose will be afforced a degree of protection in the event a truck or similar wheeled vehicle inadvertently contacts or rolls over the protecting element.

It is therefore an object of the invention to provide protective enclosure to a pit valve installation which is connected to a source of fuel, and which discharges said fuel through a conductor in the course of the fuel being transferred to an aircraft fuel tank.

DESCRIPTION OF THE DRAWINGS

FIG. 2 is similar to FIG. 1 with the casing cover and in place.

FIG. 3 is an isometric view of the protective device.

DESCRIPTION OF THE INVENTION

Figure 1:
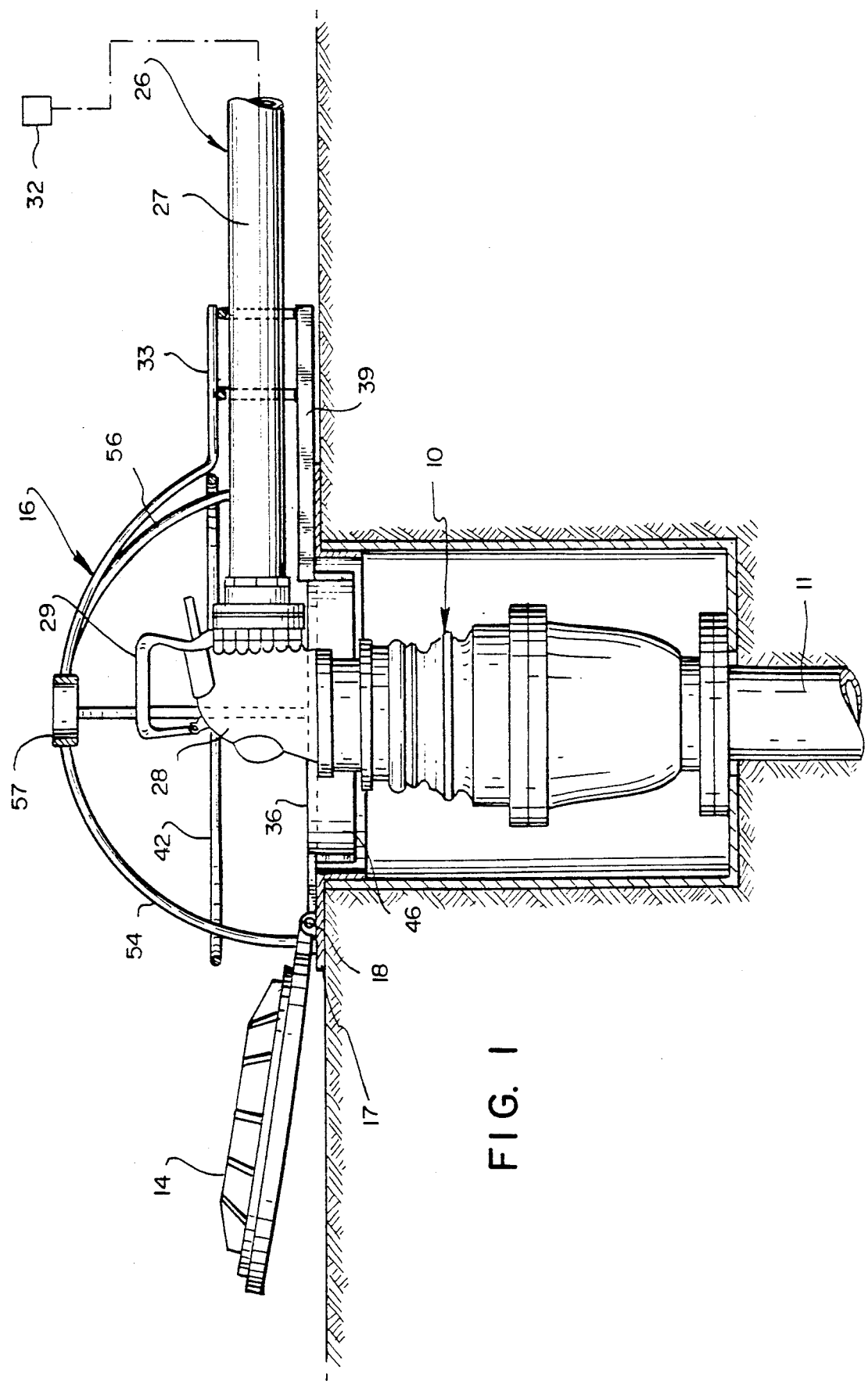
FIG. 1 is a side elevation in cross section of the instant invention in place over a pit valve casing.

Referring to FIG. 1, the invention is shown embodied in combination with a pit, or control valve 10. Said valve constitutes an integral part of a subsurface piping or manifold structure 11 which extends across a part of an airport, and particularly to the aircraft loading gates. Each pit valves is included with a casing 12, made of steel, concrete, or a suitable material, and firmly positioned in the ground.

Casing 12 is sufficiently deep to accommodate control valve 10 such that when the valve is not connected to a fuel transfer conductor, the valve's uppermost part will be below or close to ground level 13. During a non-refueling or non-use period, casing 12 is normally provided with a heavy gauge, removable cover 14. Said cover 14 can comprise a distinct and separate element. Optionally, it can pivotally depend from casing flange 17 by a hinged joint 18 at one side, thus permitting the cover to be displaced, to uncover the casing. In either instance, cover 14 when closed in place, will rest with its upper surface at ground level, on casing flange 17.

Referring to FIGS. 1 and 3, pit valve 10 is comprised of an elongated body 21 having an inlet 19 at the lower end communicated with a branch of manifold. Valve body 21 includes means forming a discharge port 22 at the body upper end, defined by a seal ring 23.

A flow control lever 24 depends from body 21, being operable between open and closed positions to regulate the flow through the valve and into a fuel transfer coupling 28.

The pit valve discharge port seal ring 23, or a similar protrusion is capable of sealing engagement with transfer coupling 28. The latter is fastened to a flexible hose 27, usually fabricated of a material to withstand the relatively high fuel pressures and the normal abuse of being manually handled for an aircraft refueling procedure. The hose is sufficiently long to extend from coupling 28 to the various fuel tanks of an aircraft parked nearby.

As shown in FIG. 1 and as noted above, one end of hose 27 is fitted with coupling 28 comprised of a metallic body having a lifting bail 29 depending from the upper side to facilitate manual handling. Coupling 28 is formed with means defining an inlet opening capable of establishing fluid tight engagement with the valve 10 seal rim 23 prior to commencement of a fuel transfer operation. A nozzle, not presently shown, fitted to the remote end of hose 27, is structured to temporarily lock into place at the inlet of an aircraft's fuel tank.

Referring to FIG. 3, the removable protective cage 16 is comprised of a base plate 36 having upper and underside surfaces. Base plate 36 further includes means to accommodate a conductor segment or a part of hose 27. A pair of connecting bars 39 and 41 which depend laterally from plate 36, support a hose protecting second cage. Base plate 36 also includes a central opening 43 which aligns with the top of casing 12 to afford access to pit valve 10.

Base plate 36 is formed with a cut away section 38 shaped to accommodate hinge 18 when cover 14 is displaced to its open position. Although essentially flat at the underside, plate 36 is provided with a downwardly projecting guide means, such as ring-like rim 46. The function of the latter is to facilitate proper positioning of cage 16 when it is lowered into the casing 12 upper end. Physically, rim 46 slidably engages the inner surface of flange 17 to allow the cage to be rotated when positioned on the casing.

For proper alignment, plate 36 can alternately be provided with a plurality of downwardly projecting tabs or pins rather than with rim 46, which register about the flange casing 17 edge.

As shown in FIG. 3, the upper side of protective cage 16 is comprised of at least one deflector element 54 having each end fastened to plate 36, forming a framework which extends across the base access opening 43. Said deflector element 54 is preferably arcuate in configuration and fastened by welding or the like to the base plate 36 upper surface.

In a preferred embodiment, the protective cage 16 upper frame includes a plurality of the deflector elements 54, all of which transverse central access opening 43 to in effect define an open, convex framework across the base plate and connector 28.

To rigidize the open framework it is preferably fixed at both its ends to the base plate 36 and is further provided with a peripheral, external reinforcing brace 42 spaced above the base plate 36, between said plate and the uppermost junction of the deflector elements.

To further rigidify frame deflector elements, the latter are mutually joined at a central point above access opening 43. Thus, while said elements are preferably arcuate in configuration, in one embodiment they can be joined at a common ring-like junction 57 at the cage apex. The utility of such a structure is to accommodate a highly visible marker such as a light, in the instance of night operations. In daylight, a mast, pendant, or similar upstanding member can be used to provide a visible warning to those working in the area of the presence of the protective cage.

Although conductor hose 27 is not as susceptible to damage as is coupling 28, should either one be contacted by a heavy vehicle or truck the protective enclosure includes a laterally extending segment 33 which also encloses a short segment of the hose. As illustrated in FIG. 3, said lateral segment includes spaced apart plates 39 and 41 with which extend laterally from and which are welded to base plate 36.

A plurality of transverse members 34 span the space between the plates 39 and 41, are connected to said element 39 and 41 to define an open framework which registers about hose 27.

Operationally, to carry out a refueling procedure, an aircraft is preferably parked closely adjacent to the fuel control pit valve 10. After cover 14 is either opened or displaced from casing 12 to expose pit valve 10, fuel transfer coupling 28 is engaged to the valve discharge port 22. This is done by mechanically fastening conductor coupling 28 in place thereby achieving a vapor tight seal therebetween.

After nozzle 32 at the other end of the hose 27 is fastened to an aircraft fuel tank, protective cage 16 is applied to the casing 12 open upper end with hose guard segment 33 registered about that portion of hose 27 which is nearest to coupling 28.

With fuel transfer conductor 26 sealably fastened at both ends, an operator can initiate flow of fuel into the aircraft tank by adjusting valve handle 24. This is achieved by reaching through the cage 16 and manually making the necessary handle adjustment.

After completion of the refueling operation, fuel transfer conductor 26 is detached from the aircraft, cage 16 is removed from flange 17 of casing 12 and coupling 28 is detached from pit valve 10.

Cover 14 can now be returned to its normal position at ground level covering the open top end of casing 12, the cage can be completely removed for reuse on a subsequent fuel transfer operation.

It is understood that although modifications and variations of the invention can be made without departing from the spirit and scope thereof, only such limitations should be imposed as are indicated in the appended claims.

We claim:

1. The combination with a pit valve casing embedded into the ground, having a ground level flange at the casing upper end, said casing enclosing a subsurface pit valve communicated with a source of liquid to be transferred, said pit valve having adapted to provisionally engage a connector having a liquid transfer hose depending therefrom, of a protective enclosure for engagement with said ground level flange during a liquid transfer operation, and comprising:
a base plate having upper and under surfaces and means defining an access opening therethrough,
at least one deflector element depending from said base plate upper surface and extending transversely above said means forming said access opening, and
a hose deflector means depending laterally from said base to register about a segment of said liquid transfer hose adjacent to said connector.

2. In the combination as defined in claim 1 wherein said at least one deflector element is generally arcuate in configuration to define an open convex barrier across said means forming said access opening.

3. In the combination as defined in claim 1 wherein said at least one deflector element includes a plurality of said elements extending transversely of said means defining said access opening and forming an open framework above said connector.

4. In the combination at defined in claim 3 wherein said plurality of deflector elements are joined at a common juncture adjacent to an upper most point above said access opening.

5. In the combination as defined in claim 3, wherein said framework includes: at least one peripheral brace engaging the respective plurality of deflector elements at a point spaced upward from said base plate.

6. In the combination as defined in claim 5, wherein said at least one peripheral brace engages the outer side of said framework.

7. In the combination as defined in claim 4, wherein said plurality of deflector elements are jointed at a common ring-like member defining a receptacle for receiving a warning device.

8. In the combination as defined in claim 1, including: a guide segment depending downwardly from the base plate underside to slidably register with said means forming said access opening.

9. In the combination as defined in claim 8, wherein said guide segment includes: a plurality of circularly spaced and downwardly extending protrusions.

10. In the apparatus as defined in claim 8, wherein said guide segment includes: a rim having a diameter less than the diameter of said casing whereby said protective cage can be horizontally rotated while in engagement with said ground level flange.

* * * * *